US012220714B2

(12) United States Patent
Elnajjar et al.

(10) Patent No.: US 12,220,714 B2
(45) Date of Patent: Feb. 11, 2025

(54) DOUBLE-SIDED FLUIDIC OSCILLATOR JET

(71) Applicant: United Arab Emirates University, Al Ain (AE)

(72) Inventors: Emad Elnajjar, Al Ain (AE); Mohammed Sami Uddin Khan, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 18/170,248

(22) Filed: Feb. 16, 2023

(65) Prior Publication Data

US 2024/0278263 A1 Aug. 22, 2024

(51) Int. Cl.

| | |
|---|---|
| ***B05B 1/08*** | (2006.01) |
| ***B05B 1/34*** | (2006.01) |
| ***F28F 13/00*** | (2006.01) |
| ***F28F 13/10*** | (2006.01) |

(52) U.S. Cl.

CPC .................. *B05B 1/08* (2013.01); *B05B 1/34* (2013.01); *F28F 13/00* (2013.01); *F28F 13/10* (2013.01); *Y10S 165/908* (2013.01)

(58) Field of Classification Search

CPC .................................... B05B 1/08; B05B 1/34
USPC ........................................................ 239/589.1
See application file for complete search history.

(56) References Cited

U.S. PATENT DOCUMENTS

| | | | | |
|---|---|---|---|---|
| 2010/0139414 A1* | 6/2010 | Sanderson | G01F 1/3227 | 73/861.19 |
| 2012/0037731 A1* | 2/2012 | Cheng | F15C 1/22 | 239/589.1 |
| 2019/0145441 A1* | 5/2019 | Tomac | B05B 1/08 | 137/826 |
| 2020/0376503 A1* | 12/2020 | Wintering | B60S 1/52 | |
| 2022/0339644 A1* | 10/2022 | Kolekar | B05B 1/18 | |
| 2022/0401969 A1* | 12/2022 | Tomac | B05B 1/08 | |
| 2023/0264206 A1* | 8/2023 | Leavitt | F15C 1/22 | 239/99 |

FOREIGN PATENT DOCUMENTS

WO WO-2021145905 A1 * 7/2021 ............... B05B 1/08

* cited by examiner

*Primary Examiner* — Darren W Gorman
(74) *Attorney, Agent, or Firm* — Hayes Soloway P.C.

(57) ABSTRACT

A double-sided fluidic oscillator, includes a primary feedback loop unit, a secondary feedback loop unit with two outlet and one inlet, and a common mixing chamber. Two perpendicular oscillator jets operating at different oscillation frequencies produce perpendicular and bi-stable pulsating flow oscillations, simultaneously. The proposed design of the fluidic oscillator is a double-sided fluidic oscillator. Also, disclosed is a method of achieving an enhanced heat and mass transfer by better mixing due to the wide sweeping pattern over a target surface using the double-sided fluidic oscillator.

11 Claims, 10 Drawing Sheets

DOUBLE-SIDED FLUIDIC OSCILLATOR JET

FIELD OF THE INVENTION

The present invention relates to the field of fluidic oscillators, and more particularly to a double-sided fluidic oscillator jet.

BACKGROUND OF THE INVENTION

Background description includes information that will be useful in understanding the present invention. It is not an admission that any of the information provided herein is prior art or relevant to the presently claimed invention, or that any publication specifically or implicitly referenced is prior art.

Fluidic oscillators are devices that create a pulsating or sweeping motion of a fluid solely based on their internal dynamics without the use of any moving parts. The sweeping pattern produced by a fluidic oscillator is based on the principle of Coanda effect (the action in fluid mechanics whereby a flow along a solid surface tends to follow the curvature of the surface rather than separating) thus making fluidic oscillators to be self-sustained. Fluidic oscillators are preferable for applications including drag reduction, noise control and heat transfer enhancement, due to the unstable character.

Over the last two decades, fluidic oscillators have gain renewed interest through their use as active flow control devices, and this has sparked a broader interest to develop novel devices and explore innovative applications. Fluidic oscillators also have applications in areas such as drag reduction devices, considering the resulting separation bubbles which produce a substantial total pressure loss.

The range of potential applications for fluidic oscillators is rounded off by the topic of air bubble generation. Creating air bubbles with defined diameters is of high interest not only for scientific observations but also for several practical applications such as wastewater treatment or oxygen supply at fish farms. Fluidic oscillators as a self-oscillating impinging jet have demonstrated higher heat transfer rates as it results in even distribution of a pressurized coolant over the target surface. Oscillating or pulsatile fluid flow in many applications have been proven to improve integral quantities such as mass diffusion, skin friction, heat transfer and overall sound pressure level due to interruption of velocity and thermal boundary layer and facilitation of the transition to the turbulent regime. Efficiency of apparatuses utilizing this type of fluid flow has been verified in many industries including controllers, chemicals and processes, medicals, instrumentations, HVAC and recently heat transfer.

Conventional or traditional fluidic oscillators have two feedback loops and an outlet to provide an uniaxially sweeping jet outlet. Fluidic oscillators with zero feedback channels, or so-called feedback-free oscillators are based on two jets colliding within a mixing chamber, which creates an oscillatory outflow direction at the exit of the chamber. Traditionally, a fluidic oscillator configuration using a single exit, was numerically evaluated in 3D at Reynolds 30000 using the SST turbulent model. Two geometry parameters, the mixing chamber inlet and outlet widths were modified, and a significant effect of the flow structure and the feedback channel flow rate was observed when modifying the inlet width, and negligible effects were observed when modifying the outlet width. The output frequency and amplitude effects whenever the (FC) and the mixing chamber (MC) lengths were modified, and it was observed that an increase of the feedback channel length generated no modifications on the output frequency. On the other hand, the increase of the mixing chamber length, generated a clear reduction on the actuator output frequency.

Based on the above, and considering the shortcomings of currently employed fluidic oscillators, there exists a need to develop a new approach to overcome these drawbacks/shortcomings of fluidic oscillators and to display better results.

SUMMARY OF THE INVENTION

Aspects of the disclosed embodiments seek to provide a double-sided fluidic oscillator jet, which overcomes the shortcomings of traditionally employed fluidic oscillators.

In accordance with an embodiment of the present invention, a fluidic oscillator is disclosed, comprising a primary feedback loop unit, a secondary feedback loop unit, with two outlets and one inlet; a common mixing chamber; and at least two perpendicular oscillator jets operating at different oscillation frequencies, producing perpendicular and bistable pulsating flow oscillations, simultaneously.

In accordance with another embodiment of the present invention, the fluidic oscillator is a double-sided fluidic oscillator.

In another embodiment of the present invention, the at least two perpendicular oscillator jets also provide biaxial sweeping jet patterns with vertical (top-bottom) and horizontal (left-right) sweeping range of oscillations, thereby increasing a cooling area coverage.

In another embodiment of the present invention, the primary feedback loop unit comprises at least two feedback loops.

In another embodiment of the present invention, the secondary feedback loop unit comprises at least two feedback loops.

In another embodiment of the present invention, the fluidic oscillator further comprises a chevron-shaped design nozzle at the outlet, which assists in achieving a turbulent outlet sweeping pattern, thereby augmenting heat transfer over a target surface.

In another embodiment of the present invention, if the fluidic oscillator comprises two inlets an observation is made that the resulting two incoming fluids from the two different inlets entering the common mixing chamber negates the Coanda effect and thereby creates a steady fluid flow.

As another aspect of the present invention, a method of achieving a wide sweeping pattern and augmenting heat transfer over a target surface using a double-sided fluidic oscillator is disclosed.

The method comprises the steps of switching of fluid between primary and secondary feedback loop units for achieving a biaxial sweeping jet pattern along the target surface, allowing a fraction of the mass fluid flow rate to enter the secondary feedback loop, wherein the primary feedback loop unit produces a horizontal sweeping pattern, and the secondary feedback loop unit produces a vertical sweeping pattern, thereby providing the biaxial sweeping jet patterns via the primary and secondary feedback loop units operating at different frequencies.

Additional aspects of the invention will be set forth in part in the description which follows, and in part will be obvious from the description, or may be learned by practice of the invention.

BRIEF DESCRIPTION OF THE DRAWINGS

The manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 8A-8C shows a representation of double-sided fluidic oscillator with: FIG. 8A showing a primary-jet (focused) and secondary-jet (wire-framed), FIG. 8B showing a primary-jet (wire-framed) and secondary-jet (focused) and FIG. 8C showing a primary-jet and Secondary-jet, both wire-framed model.

Figure 1:
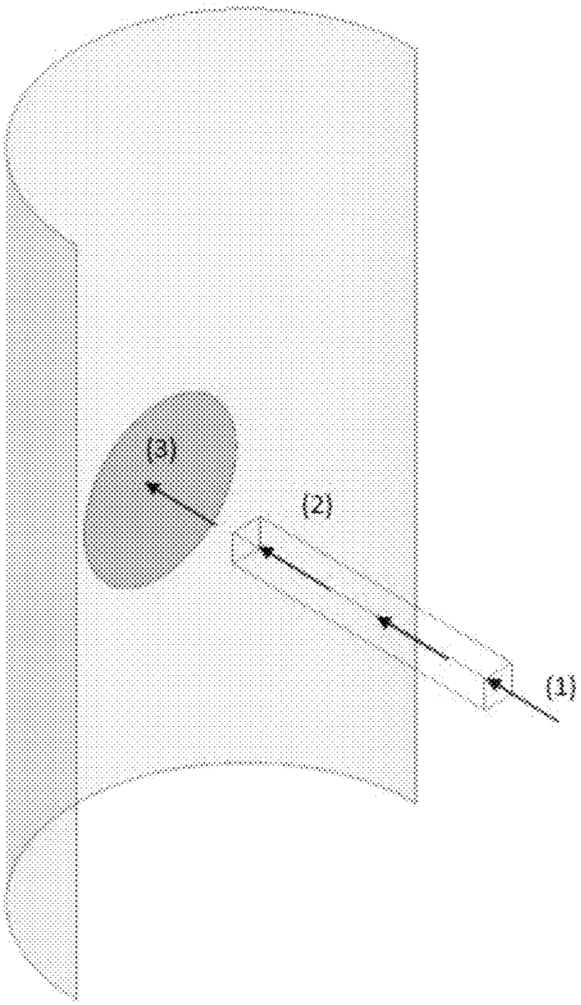
Fig. 1 (PRIOR ART)
FIG. 1 shows a steady jet.

The foregoing and other objects, features and advantages of the present invention, as well as the invention itself, will be more fully understood from the following description of preferred embodiments, when read together with the accompanying drawings.

ELEMENT LIST

1—Common inlet
2—Double outlet
3—Common mixing chamber
4—Primary right feedback loop
5—Primary left feedback loop
6—Secondary top feedback loop
7—Secondary bottom feedback loop

DETAILED DESCRIPTION

The present invention relates to the field of fluidic oscillators, and more particularly to designing a double-sided fluidic oscillator jet.

The principles of the present invention and their advantages are best understood by referring to FIG. 1 to FIG. 8C. In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to “one embodiment,” “an embodiment,” “embodiments,” or “one or more embodiments” are intended to indicate that a particular feature, structure, or characteristic described in connection with the embodiment is included in at least one embodiment of the present disclosure.

The present invention deals with a modified angled fluidic oscillator producing a double-oscillating jet. A primary feature of the double sided perpendicular fluidic oscillator is to provide biaxial sweeping jet patterns—a horizontally sweeping jet along the target curved surface via a primary oscillating jet, and a vertically sweeping along the target surface axis, via a secondary oscillating jet. In accordance with an embodiment of the present invention, the proposed fluidic oscillator comprises four feedback loops, two outlets, a common mixing chamber, and an inlet.

The present invention focuses on jet flow cooling, and particularly towards the sweeping jet technique using a modified angled fluidic oscillator (double fluidic oscillator jet). The proposed double fluidic oscillator jet provides simultaneously, two perpendicular sweeping jets vertically (up-down motion) and horizontally oscillating (left-right motion) at different frequencies. The invention involves the addition of secondary feedback loops along with primary feedback loops. The working principle involves that a fraction of the mass fluid flow rate enters into the secondary feedback loops which leads to producing a vertical sweeping pattern providing more cooling area at exits with a common mixing chamber. The primary feature of the proposed double oscillating jet—is to provide biaxial sweeping jet patterns including a horizontally sweeping jet along the target curved surface (primary oscillating jet), and a secondary oscillating jet vertically sweeping along the target surface axis. The primary jet sweeping horizontally, meanwhile, the secondary jet sweeping vertically.

FIG. 1 shows a conventional steady jet comprising an inlet (1) and outlet (2), wherein when fluid is supplied, it generally forms a circular pattern (3) at the target surface offering highest cooling at the stagnation point (which is the point of hitting the target surface).

Figure 2:
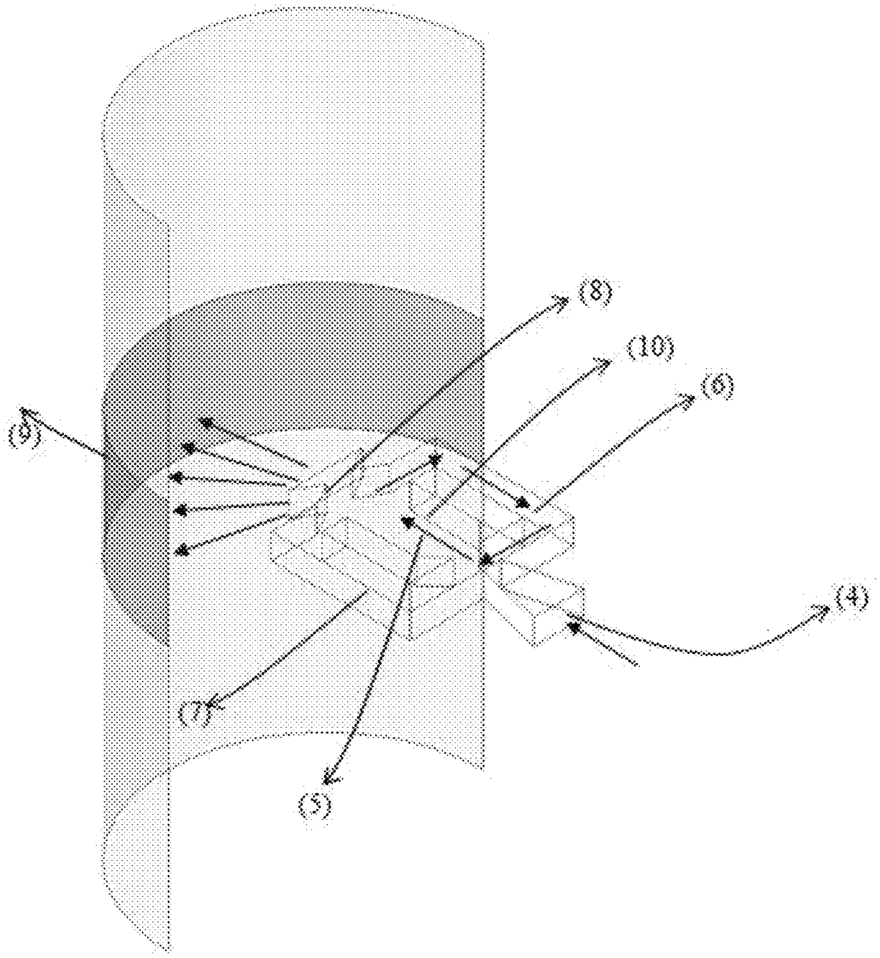
Fig. 2 (PRIOR ART)
FIG. 2 shows a conventional fluidic oscillator.

FIG. 2 also displays a conventional fluidic oscillator. The introduction of a fluidic oscillator as a cooling jet offers a wide area of cooling (9) in comparison to steady jet cooling (3). The high-pressure fluid gushes through the power nozzle (4) directed from the supply and attaches itself to one of the walls of feedback channel (10) in the mixing chamber (5) because of the turbulent jet entraining the surrounding fluid—which is known as the Coanda effect. This effect drives certain portion of the fluid into the adjacent feedback channel (6) via the separator-walls. This fluid returns pressure waves to the control port, causing the power jet to separate from the side wall. The power jet is then switched to the opposite wall, and the process is repeated, i.e., flow enters the other feedback channel (7) resulting in an oscillatory fluid motion at the throat’s exit (8).

Figure 3:
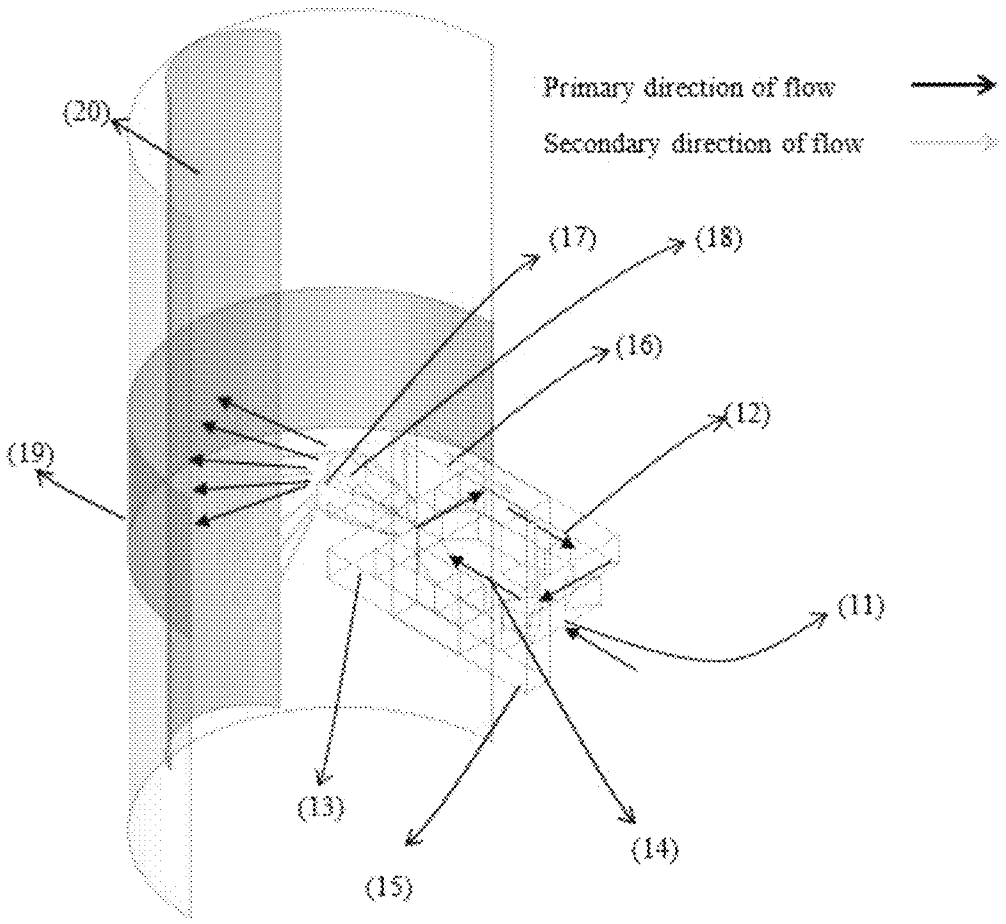
FIG. 3 shows embodiment of the double-sided fluidic oscillator jet, in accordance with the present invention.

Accordingly, to overcome the drawbacks faced by fluidic oscillators in the past, the present invention proposes the addition of at least one primary feedback loop and at least one secondary feedback loop for the fluidic oscillator. FIG. 3 depicts an embodiment of the present invention, with the addition of secondary feedback loops (15, 16) along with primary feedback loops (12, 13) and a single inlet (11). The working principle of the proposed fluidic oscillator involves switching of fluid in the feedback loops for achieving sweeping jet patterns and giving emphasis to the feature wherein a fraction of the mass flow rate enters into the secondary feedback loops which produce a vertical sweeping pattern providing more cooling area (19, 20) at exits (17, 18) with a common mixing chamber (14)—as compared to conventional fluidic oscillator. Although the conventional fluidic oscillator covered a larger area of cooling (9) as compared to steady jet (3) cooling area, a drawback is that it only covered sweeping area horizontally.

Figure 4A:
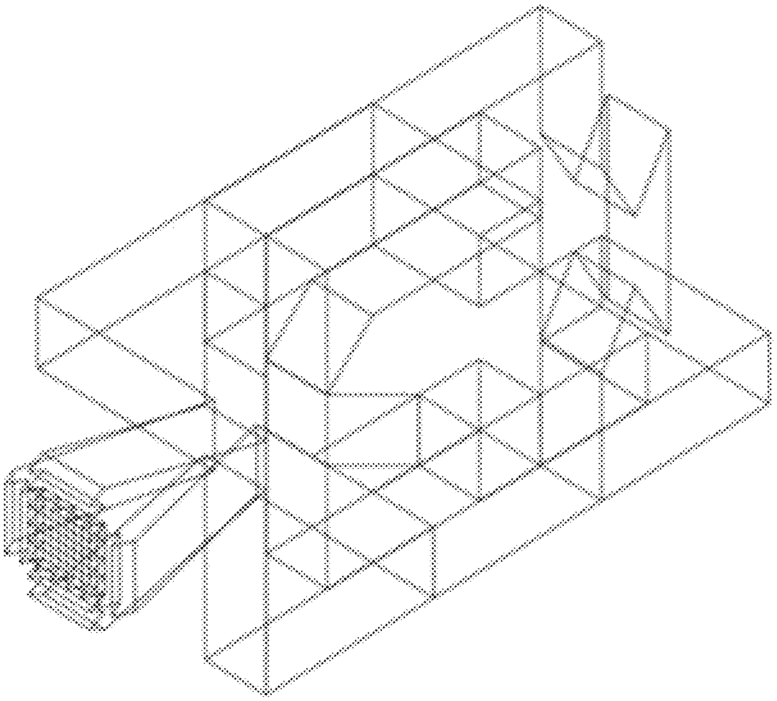
FIG. 4A shows another embodiment of the double-sided fluidic oscillator with a chevron design at the exit.
Figure 4B:
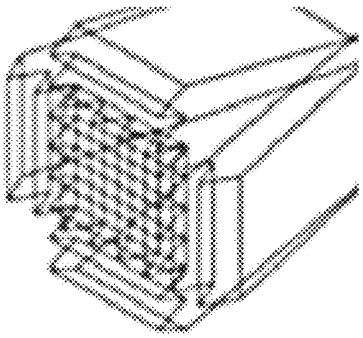
FIG. 4B is a zoomed-in version of the double-sided fluidic oscillator with a chevron design (zigzag) at the exit, in accordance with the present invention.

FIG. 4A depicts a double-side fluidic oscillator in accordance with the present invention, with a chevron-designed nozzle located at the exit portion, and FIG. 4B is a zoomed in view of the said double-side fluidic oscillator with a chevron (zig-zag) nozzle exit. This embodiment comprises a plurality of chevron designs at the nozzle exits (17, 18), and the working principle again is similar to that of the double-sided fluidic oscillator except that at the exit the fluid is enforced on to zigzag (chevrons) shaped outlets. This results in a more turbulent outlet sweeping pattern, thereby augmenting the heat transfer over the target surface.

Figure 5A:
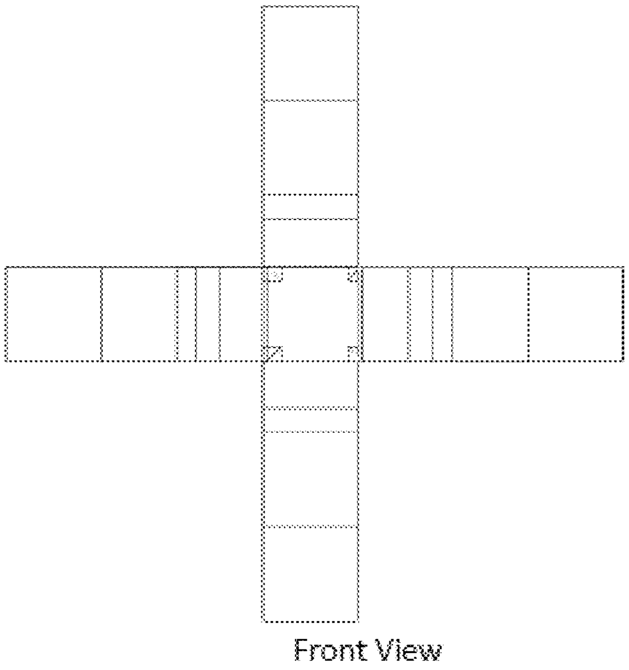
FIGS. 5A, 5B and 5C show front, top and side views of a wire frame model of the proposed double oscillating jet.
Figure 5B:
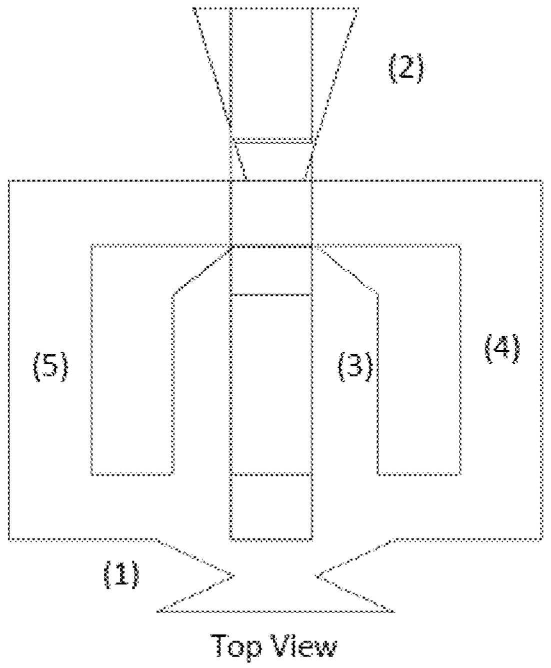
Figure 5C:
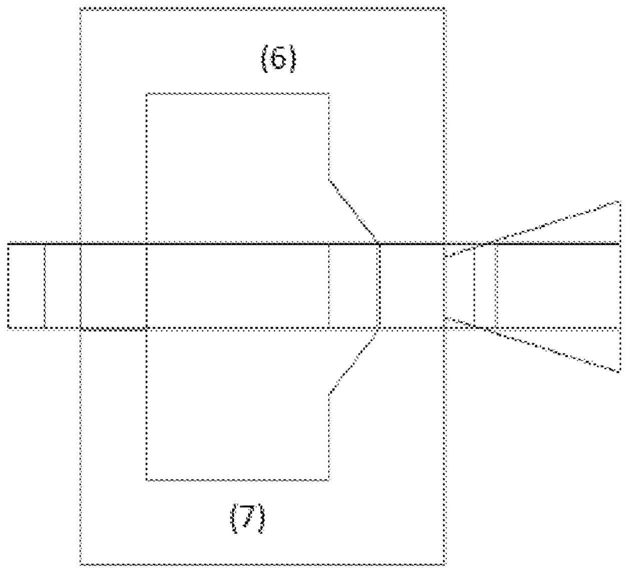

FIGS. 5A-5C show various wire frame models of the proposed double oscillating jet, which is a modified angled fluidic oscillator with four feedback loops (4, 5) and (6, 7), two outlets (2), a common mixing chamber (3) and an inlet (1). The promising feature is the biaxial sweeping jet patterns created via the primary oscillating jet and secondary oscillating jet, respectively. The biaxial sweeping patterns include horizontally sweeping jet along the target curved surface, and vertically sweeping along the target surface axis. FIG. 5A shows a front view, FIG. 5B shows a top view and FIG. 5C shows a side view of the proposed double oscillating jet.

Figure 6A:
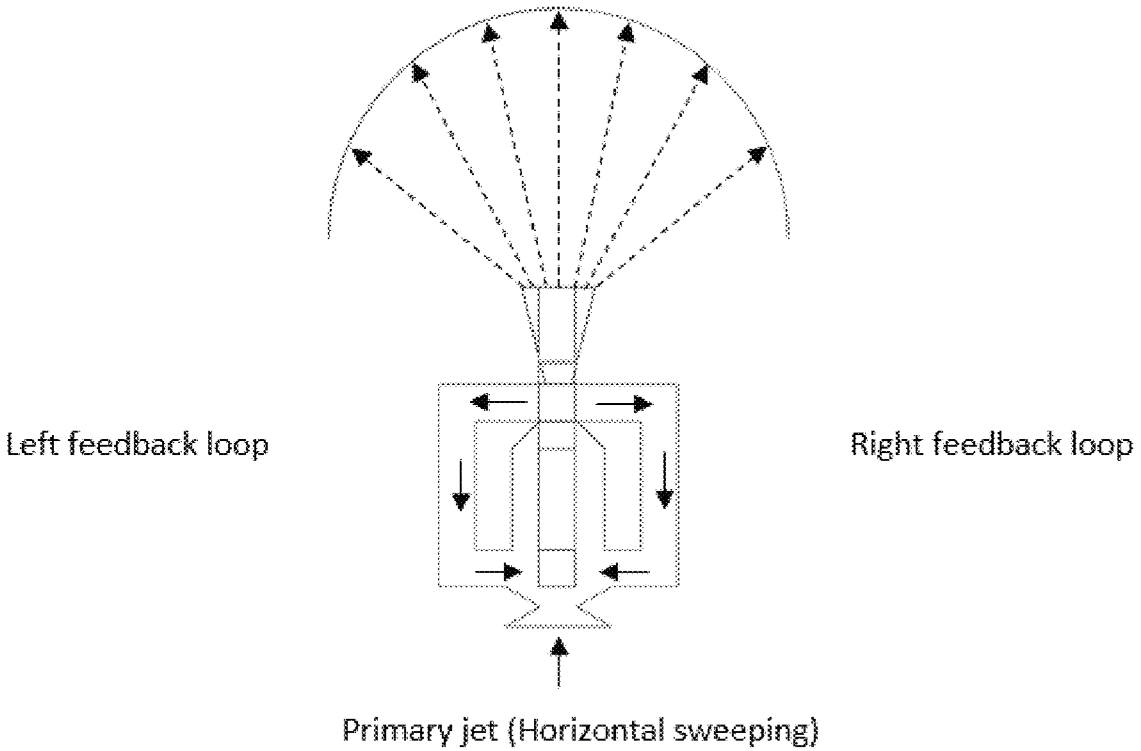
FIGS. 6A and 6B are representations of the sweeping area covered over a leading edge by a Primary jet and a Secondary jet, respectively.
Figure 6B:
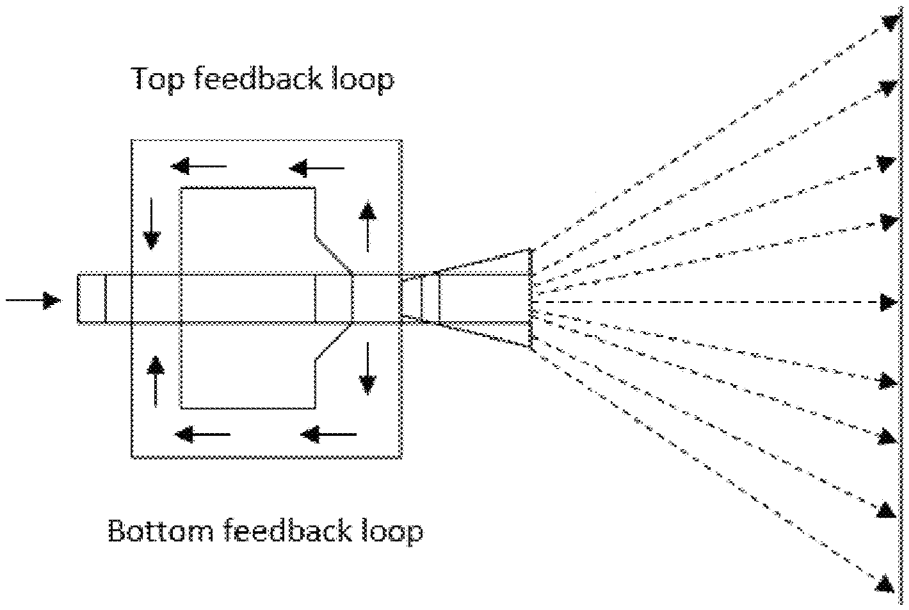
Figure 7:
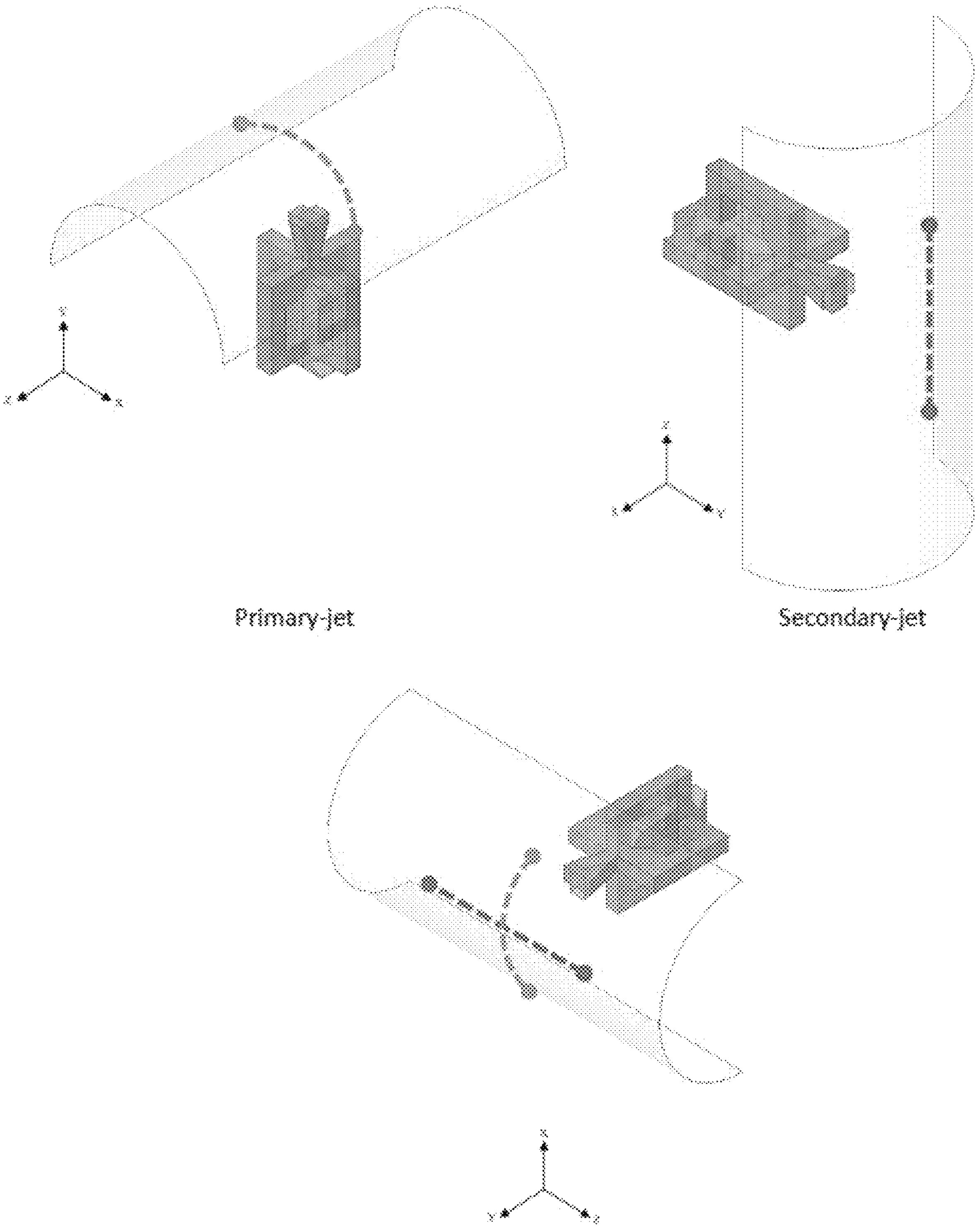
FIG. 7 show a plurality of isometric views over a leading edge by the double-sided fluidic oscillator jet, in accordance with the present invention.

FIGS. 6A and 6B are representations of the sweeping area covered over leading edge by both a Primary jet, as well as a Secondary jet, respectively. FIG. 7 is an isometric view over leading edge of the double-oscillating jet, in accordance with the present invention.

Figure 8A:
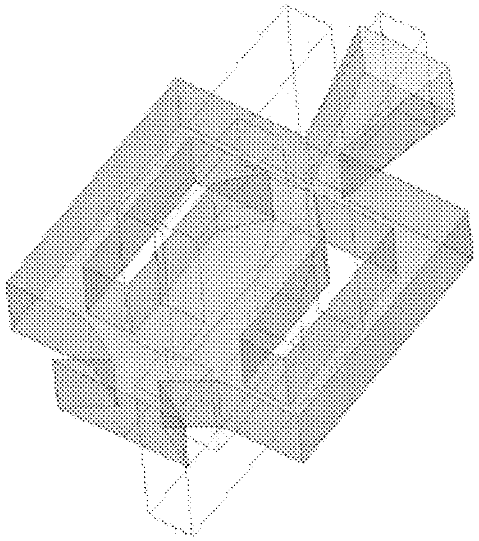
Figure 8B:
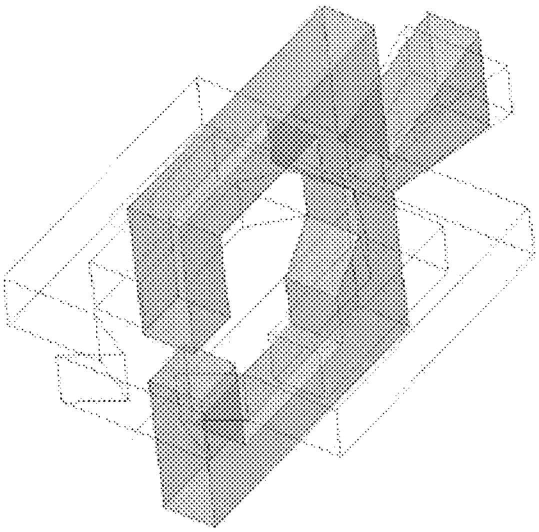
Figure 8C:
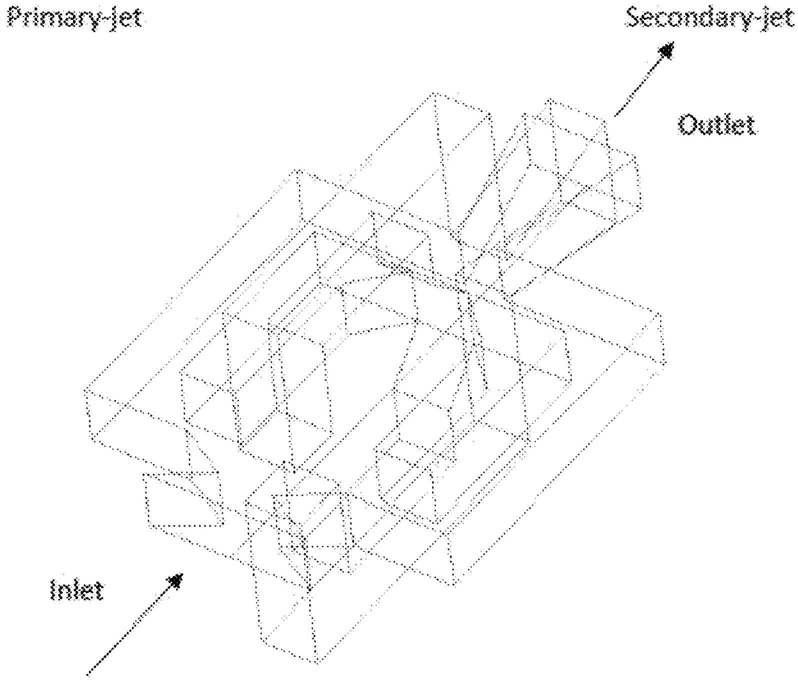

FIGS. 8A-8C represents images of the primary and secondary jets in accordance with the present invention, the primary jet sweeping horizontally, and the secondary jet sweeping vertically. The promising feature of the present proposed design includes providing biaxial sweeping jet patterns along the target curved surface (horizontally and vertically). FIG. 8A shows a primary-jet (focused) and secondary-jet (wire-framed), FIG. 8B shows a primary-jet (wire-framed) and secondary-jet (focused) and FIG. 8C shows a primary-jet and Secondary-jet, both wire-framed model.

In accordance with an embodiment of the present invention, the operating frequencies on the primary jet (high frequency oscillation) and secondary jet (low frequency oscillation), are determined based on the mass fluid flow fraction in each jet. For the same mass flow rate, the single jet oscillates in one direction covering smaller region and a less turbulent flow field compared to the double oscillating jets. In contrast, the proposed double-sided oscillating jet is capable of achieving biaxial sweeping jet outlet via the addition of two feedback loop units and one outlet (normal to the existing feedback loops and outlet). These additional feedback loops with an extra outlet support the movement of the sweeping jet biaxially, thereby covering a broader surface area, creating a more efficient mixing area. The proposed double-fluidic oscillator jet provides two perpendicular sweeping jets vertically (oscillating up-down) and horizontally oscillating (left-right) simultaneously—at different frequencies. The oscillating frequencies depend on the geometry and flow rates. The resulting output jet is a more turbulent outlet due to the resulting sweeping pattern and based on the mass flow fraction of each jet, the primary and the secondary oscillating jet frequencies are determined.

The biaxially sweeping jet coverage covers a wider area of jet impingements compared to the steady and conventional oscillating jet and as a result provides more enhanced heat transfer, mass transfer and mixing performance.

A computational fluid dynamic analysis is performed to support the feature of the double sweeping pattern, wherein both the primary and secondary oscillations were clearly observed which provided a higher cooling area coverage with vertical (top-bottom) and horizontal (left-right) sweeping range of oscillations covering a wider area of jet impingement comparing to single oscillating and steady jets. A number of computational fluid dynamics (CFD) simulations are performed to test the operation of the proposed double side fluid oscillator.

Efficiency of the proposed double-oscillating jet may be enhanced, by introducing a separate inlet which directly feeds into the feedback loops of the secondary jet. The proposed oscillator jet may be used in industrial applications such as in enhancing heat transfer and mass transfer, as well as for the electronic cooling of mass transfer industries.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the invention, defined in scope by the following claims. Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. A fluidic oscillator, comprising:

a primary feedback loop unit comprising a single inlet and a single mixing chamber;

a secondary feedback loop unit in fluid communication with the single inlet and the single mixing chamber of the primary feedback loop unit; and at least one outlet;

whereby fluid entering the single inlet of the primary feedback loop unit produces at least two perpendicular oscillator jets operating at different oscillation frequencies, thus producing perpendicular and bi-stable pulsating flow oscillations, simultaneously, wherein switching of fluid occurs between the primary and secondary feedback loop units for achieving sweeping jet patterns.

2. The fluidic oscillator of claim 1, wherein the at least two perpendicular oscillator jets also provide biaxial sweeping jet patterns with vertical (top-bottom) and horizontal (left-right) sweeping range of oscillations, thereby increasing a cooling area coverage.

3. The fluidic oscillator of claim 1, wherein the primary feedback loop unit comprises at least two feedback loops.

4. The fluidic oscillator of claim 1, wherein the secondary feedback loop unit comprises at least two feedback loops.

5. The fluidic oscillator of claim 1, further comprising a chevron-shaped design nozzle at the at least one outlet, which assists in achieving a turbulent outlet sweeping pattern, thereby augmenting heat transfer over a target surface.

6. The fluidic oscillator of claim 1, wherein the fluidic oscillator is a double-sided fluidic oscillator.

7. The fluidic oscillator of claim 1, wherein a fraction of mass flow rate of the fluid further enters into the secondary feedback loop unit which produces a vertical sweeping pattern providing a cooling area at the at least one outlet.

8. The fluidic oscillator of claim 1, wherein a side wall of the primary feedback loop unit meets a bottom wall of the primary feedback loop unit at a 90 degree angle.

9. The fluidic oscillator of claim 1, wherein a side wall of the secondary feedback loop unit meets a bottom wall of the secondary feedback loop unit at a 90 degree angle.

10. The fluidic oscillator of claim 1, wherein the mixing chamber and the primary feedback loop unit are in a same plane, and the mixing chamber extends into the same plane towards an at least one channel of the primary feedback loop unit.

11. The fluidic oscillator of claim 1, wherein a fraction of a mass fluid flow enters as input for the secondary feedback loop unit.

* * * * *